Patented Nov. 27, 1923.

1,475,522

UNITED STATES PATENT OFFICE.

EUGENE THEIMER, OF NEWARK, NEW JERSEY, ASSIGNOR, BY MESNE ASSIGNMENTS, TO R. F. STEWARD, OF WASHINGTON, DISTRICT OF COLUMBIA.

ART OF PREPARING ALKYL DERIVATIVES OF ORGANIC COMPOUNDS.

No Drawing. Application filed June 4, 1919, Serial No. 301,686. Renewed April 18, 1923. Serial No. 551,212.

*To all whom it may concern:*

Be it known that I, EUGENE THEIMER, a citizen of the United States, residing at Newark, in the county of Essex and State of New Jersey, have invented certain new and useful Improvements in the Art of Preparing Alkyl Derivatives of Organic Compounds; and I do hereby declare the following to be a full, clear, and exact description of the invention, such as will enable others skilled in the art to which it appertains to make and use the same.

This invention relates to the art of preparing alkyl derivatives of organic compounds; and it has to do more particularly with methods of preparing alkyl derivatives of phenacetin, such as methyl phenacetin.

The present process is of especial utility in alkylating compounds of the paraminophenol type, the termination "phenol" being here used in a broad sense to include cresols, etc. More particularly, the invention has to do with preparation of alkyl derivatives of compounds having the type formula

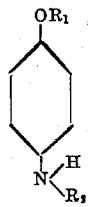

where $R_1$ is an alkyl group, and $R_2$ is an acidyl group. Specific examples of such compounds are acetphenetidin or phenacetin, acetyl anisidin, and formyl anisidin. The preparation of methyl phenacetin from phenacetin constitutes at present one of the most important practical applications of the invention, and it will therefore be hereinafter described in detail as a typical example embodying the underlying principles of the invention. Where specific proportions of the various materials employed are referred to in the following description, it is to be understood that these simply represent the best reacting proportions now known to me, and that said proportions may be varied within the scope of the invention while still realizing the benefits thereof in some measure.

In applying the present process to the preparation of methyl phenacetin from phenacetin, the general procedure comprises reacting upon phenacetin with an alkali metal in an available form, most desirably in the form of the free alkali metal, such as metallic sodium, in the presence of a suitable diluent or reaction medium, and then treating the resultant intermediate alkali metal compound of phenacetin with a methylating agent such as a methyl halid. In order to ensure best results, I have found it important that the reaction mass treated with the methylating agent be in the form of a solution or homogeneous liquid mixture. But in carrying out the reaction of metallic sodium on phenacetin which has been merely dissolved in xylol, for example, as the diluent or reaction medium, the reaction product, sodium-phenacetin, separates and causes the reaction mixture to congeal to a more or less crystalline white mass toward the end of the reaction, and this mass does not dissolve even upon addition of hot xylol and continued heating.

I have discovered, however, that a homogeneous liquid mixture can be had at this stage of the process by ensuring the presence in the mixture of one of the later reaction products, methyl phenacetin being particularly effective for this purpose. By the use of this liquefying agent, methyl phenacetin, it is possible either to entirely prevent the congelation of the mixture resulting from the reaction of sodium on phenacetin, or to bring the congealed mass into a state of solution or liquefaction, depending upon the particular method most desirable to adopt under given conditions. It is most desirable in practice to prevent the mass from congealing, rather than to let it congeal and then liquefy it prior to addition of the methylating agent. Accordingly, in the best embodiment of my novel process, a suitable amount of methyl phenacetin is incorporated with phenacetin and xylol in making up the starting batch. In a typical example, which has been found to give excellent results, the starting batch or mixture may comprise 80 lbs. of phenacetin, 40 lbs. of methyl phenacetin, and 100 lbs. of xylol, or other quantities in approximately these relative proportions. Phenacetin and methyl phenacetin in these proportions give a liquid mixture or solution, without the addition of xylol or the like; but the use of a moderate amount of xylol or other substantially inert liquid diluent is most advantageous in actual practice in order to prevent development of undesirably high temperatures in the reaction of the metallic sodium on the phenacetin, the xylol in this specific example therefore apparently serving primarily more as a heat absorbent than as a solvent. The tendency toward development of unduly high temperatures in the sodium reaction is probably attributable, at least in part, to the high boiling point of methyl phenacetin. To the liquid starting batch, which should be heated if necessary until rather warm (say about 110° C.), is added metallic sodium in amount about molecularly equivalent to the phenacetin present, say 10 lbs. in the present specific example. This amount is slightly less than the theoretical amount required to combine with the phenacetin present, thus ensuring a small excess of the latter and practically complete solution of the sodium eventually. The reaction is best conducted under atmospheric pressure in a suitable vessel which is provided with a vapor offtake leading to a condenser and which is also equipped with a stirring device so that the reaction mass can be well agitated during and after the addition of the lumps of sodium. The reaction begins promptly, the sodium dissolving rapidly with generation of sufficient heat to maintain the reaction active until near its termination, when moderate external heating may usually be resorted to with advantage. The reaction is usually complete in about one and one-half hours under the described conditions of operation. The final result is a homogeneous liquid mass containing the sodium-phenacetin compound, and it exhibits no tendency to congeal as it would in the absence of the added methyl phenacetin. Nor does undesirable overheating occur if as much xylol as above specified is used in the initial mixture, this being prevented in part by the large amount of heat used up in distilling off a considerable proportion of the xylol during the reaction. The xylol thus distilled off may be condensed and recovered for re-use. Another important advantage secured by proceeding in the manner described is that on account of the comparatively small amount of xylol employed in the initial liquid mixture, the specific gravity of the mixture is relatively high, the added metallic sodium floating on the surface of the mass instead of sinking to the bottom as would be the case if the phenacetin were dissolved in a large excess of xylol. This enables accurate observation of the course of the reaction, especially as regards final solution of small globules of sodium which often persist for some time even after the reaction is apparently complete. In the present case, such small globules may be skimmed off or otherwise removed from the liquid mass very easily, if desired. It is, of course, important in practical operation to insure complete solution or removal of sodium particles prior to any treatment of the reaction mixture with water or steam at later stages of the process.

It will therefore be understood that, in the preferred embodiment of my invention, the proportion of xylol used in the initial batch or mixture is sufficiently large to ensure proper control of the reaction and to prevent overheating and decomposition; and that, on the other hand, in the best mode of practicing the process, the amount of xylol present should not be large enough to reduce the specific gravity of the mixture below the point at which the added alkali metal will float.

The reaction with sodium being completed, the still liquid mixture is next treated with a methylhalid, methyl bromid being most desirable and much preferable in practice to methyl iodid; because with gaseous methyl bromid, the reaction occurs much more smoothly and is controlled with much greater ease than where a liquid methylating agent such as methyl iodid is used. Before passing methyl bromid into the liquid mixture, it is advisable to add to the mixture an amount of xylol about equal in quantity to that distilled off during the formation of the sodium-phenacetin intermediate product. This gives a mixture of such character that the sodium bromid subsequently formed in the treatment with methyl bromid settles quickly. The liquid mass may with advantage be stirred during the treatment with methyl bromid, though this is not essential. When about one mol of methyl bromid has been absorbed, the sodium bromid is allowed to settle and the supernatant liquid is filtered first, the settlings being then brought upon the filter and washed with hot xylol which may be used in making up the next starting batch. Such xylol as adheres to the washed sodium bromid may be readily distilled off in vacuo and recovered. The filtrate contains about 123 pounds of methyl phenacetin, a small amount of unchanged phenacetin, and approximately 100 pounds of xylol. The xylol is distilled off under diminished pressure, this distillation being greatly facilitated and expedited in practice by the addition of a quart or so of water to the contents of the distilling vessel, the effect thereby produced being comparable to steam distillation. After the xylol has been driven off, the impure methyl phenacetin may be purified by distillation in vacuo. In practice, approximately the last one-third of the methyl phenacetin distillate, ordinarily containing a small amount of unchanged phenacetin, is separately collected and used for mixing with a fresh lot of phenacetin in making up another starting batch.

It is to be understood, of course, that the details of procedure and the particular proportions given in the foregoing specific example for purposes of illustration are not intended to be limiting but merely represent what at present I believe to be the best mode of practicing the invention. Moreover, while the use of methyl bromid has distinct practical advantages of great importance, the invention in its broader aspect does not exclude the use of other methylating agents, such as methyl iodid, for example.

In my prior application, Serial No. 252,722, filed September 5, 1918, of which the present application is in part a continuation, I have disclosed and claimed both broadly and specifically a process wherein the addition of the liquefying agent is deferred until after the reaction of the sodium on the phenacetin is completed and the reaction mixture has congealed or has begun to congeal. Such a procedure is ordinarily less advantageous, however, than the one described in the present application, especially because it requires the use of a very much larger quantity of xylol, say 3 to 4 times as much by weight as the phenacetin employed.

The following reactions illustrate what occurs in methylating phenacetin by successive treatment with metallic sodium and methyl bromid as above described:

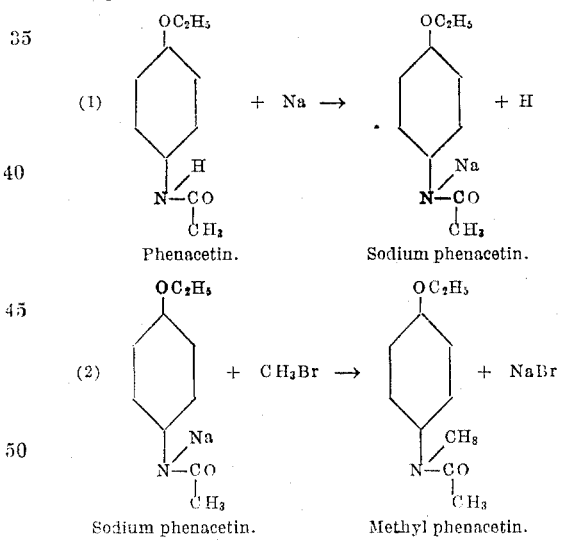

While a desirable embodiment of the invention has been described in detail for the purpose of an illustrative example, it is to be understood that various changes may be made in the procedure set forth without departing from the spirit and scope of the invention.

What I claim is:

1. The process of preparing methyl phenacetin which comprises reacting with metallic sodium upon phenacetin in liquid mixture with methyl phenacetin and xylol, passing methyl bromid into the resultant liquid mass, and substantially freeing the methyl phenacetin thus obtained from sodium bromid and xylol.

2. The process of preparing methyl phenacetin which comprises reacting with metallic sodium upon phenacetin in liquid mixture with methyl phenacetin and xylol, adding more xylol, passing methyl bromid into the resultant liquid mixture, separating sodium bromid and xylol from the reaction products, distilling methyl phenacetin from the remaining material, and using a part of the distillate in preparing another starting batch.

3. The process of preparing methyl phenacetin which comprises methylating phenacetin mixed with methyl phenacetin and a temperature-regulating diluent, by the successive action of an alkali metal and a methyl halid.

4. The process of preparing methyl phenacetin which comprises methylating phenacetin mixed with methyl phenacetin and xylol, by the successive action of metallic sodium and methyl bromid.

5. The process of preparing methyl phenacetin which comprises reacting with metallic sodium upon a liquid comprising phenacetin and methyl phenacetin, passing methyl bromid into the reaction mass, and separating the resultant methyl phenacetin.

6. The method of preparing methyl phenacetin which comprises adding metallic sodium to a warm liquid mixture of phenacetin, methyl phenacetin, and xylol, the reagents being used approximately in the proportions of 10 pounds of sodium, 80 pounds of phenacetin, 40 pounds of methyl phenacetin, and 100 pounds of xylol, stirring the mixture to expedite reaction of the sodium on the phenacetin, adding sufficient xylol to make up the loss occurring during the reaction, passing methyl bromid into the liquid mass until substantially a molecularly equivalent amount has been absorbed and meanwhile stirring the mass, filtering off sodium bromid, distilling off xylol, and purifying by vacuum distillation the crude methyl phenacetin thus obtained.

7. In a process of preparing useful products from phenacetin, the process which comprises preparing a mixture comprising phenacetin and an alkyl derivative thereof, and subjecting the mixture to an alkylating treatment.

8. In the preparation of useful products from phenacetin, the steps which comprise reacting with an alkali metal upon a liquid mixture comprising phenacetin and an alkyl derivative of phenacetin, and treating the resultant mass with an alkyl halid to convert the alkali-metal-phenacetin present into such alkyl derivative of phenacetin.

9. In the preparation of useful products from phenacetin, the steps which comprise reacting with an alkali metal upon a liquid mixture comprising phenacetin, methyl phenacetin, and a diluent, and treating the resultant mass with a methyl halid to convert the alkali-metal-phenacetin present into methyl phenacetin.

10. The method of reacting upon an organic compound with an alkali metal which comprises preparing a liquid mixture comprising such compound and a substantially inert diluent in such proportions that the specific gravity of the mixture exceeds that of the alkali metal, and treating the mixture with such alkali metal under reacting conditions.

11. The method of reacting upon phenacetin with metallic sodium which comprises preparing a liquid mixture comprising phenacetin and xylol in such proportions that sodium will float on the mixture, and adding sodium to the mixture.

In testimony whereof I hereunto affix my signature.

EUGENE THEIMER.